United States Patent [19]

Belmont

[11] Patent Number: 4,951,814
[45] Date of Patent: Aug. 28, 1990

[54] STORAGE CONTAINER FOR DIGITAL AUDIO TAPE CASSETTES

[75] Inventor: Richard E. Belmont, Valley, Ala.

[73] Assignee: Ampex Corporation, Redwood City, Calif.

[21] Appl. No.: 314,347

[22] Filed: Feb. 21, 1989

[51] Int. Cl.$^5$ ............................................. B65D 85/672
[52] U.S. Cl. .................................... 206/387; 206/472; 206/564
[58] Field of Search ............... 206/309, 311, 313, 387, 206/425, 444, 472, 557, 564, 232; 220/22, 339

[56] References Cited

U.S. PATENT DOCUMENTS

| | | | |
|---|---|---|---|
| 3,640,379 | 2/1972 | Weingarden | 206/387 |
| 3,743,081 | 7/1973 | Roberg et al. | 206/387 |
| 3,756,383 | 9/1973 | Kryter | 206/387 |
| 3,848,738 | 11/1974 | Hirsch | 206/387 |
| 4,002,355 | 1/1977 | Sendor | 206/387 |
| 4,132,311 | 1/1979 | Glinert | 206/387 |
| 4,235,490 | 11/1980 | Schwartz et al. | 206/387 |
| 4,432,453 | 2/1984 | Berkman | 206/387 |
| 4,718,550 | 1/1988 | Johnson | 206/387 |
| 4,796,755 | 1/1989 | Ardenti | 206/387 |
| 4,823,950 | 4/1989 | Roze | 206/387 |

Primary Examiner—Jimmy G. Foster
Attorney, Agent, or Firm—Elizabeth E. Strnad

[57] ABSTRACT

A storage container is of a configuration and dimensioned to retain either two DAT cassettes, two storage cases or one cassette together with one storage case. The size of the DAT cassette storage container is comparable in size and shape to a Beta video cassette storage case. The storage container has an interior structure that forms a pair of seats, each having two distinct parts. A first of the two parts is of a configuration for receiving and retaining the protective storage case for DAT cassettes. A second of the two parts is of a configuration for receiving the DAT cassette itself and retaining it within the container. The storage case and cassette are retained within the container with their length dimensions orthogonal.

4 Claims, 2 Drawing Sheets

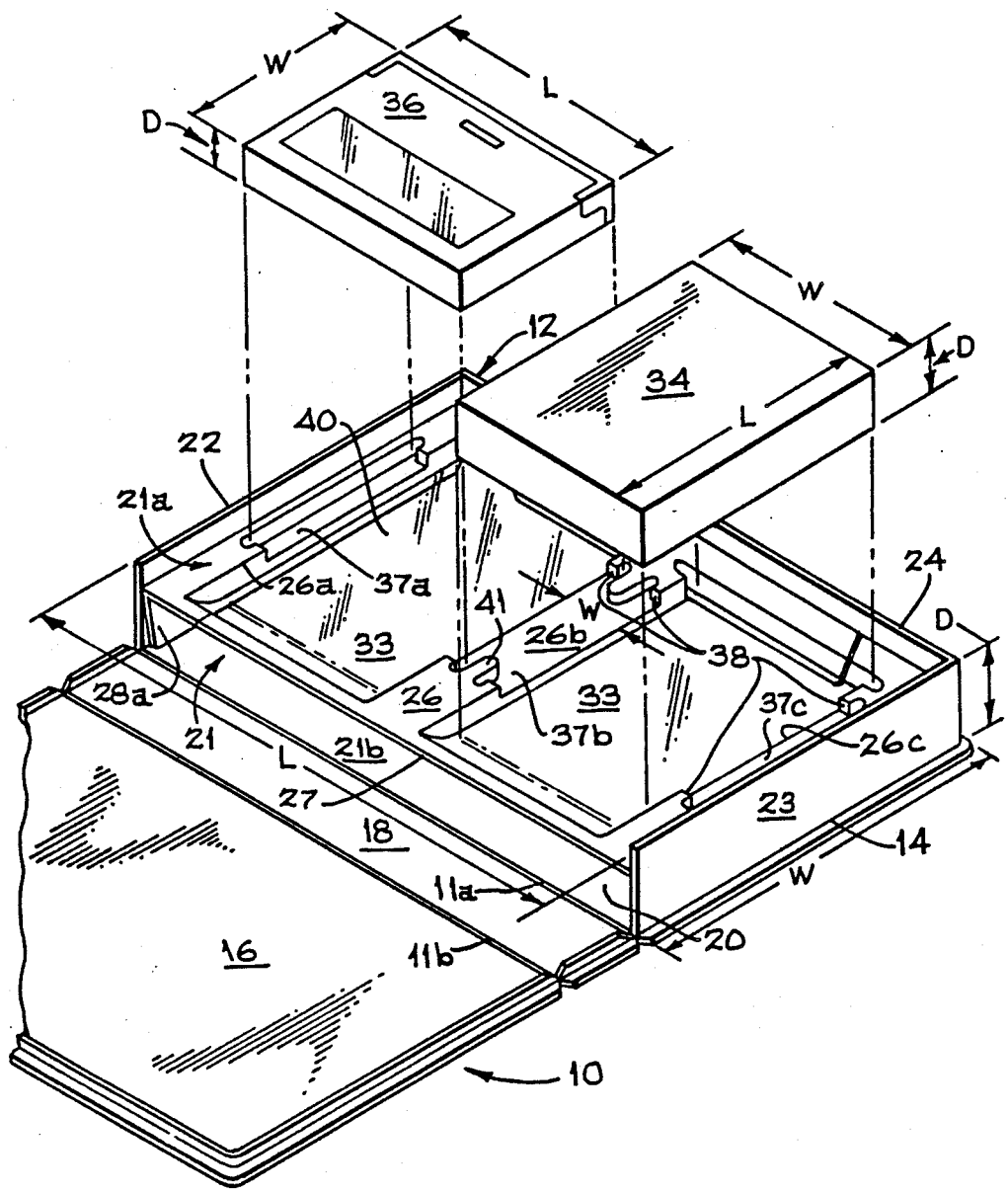
FIG_1

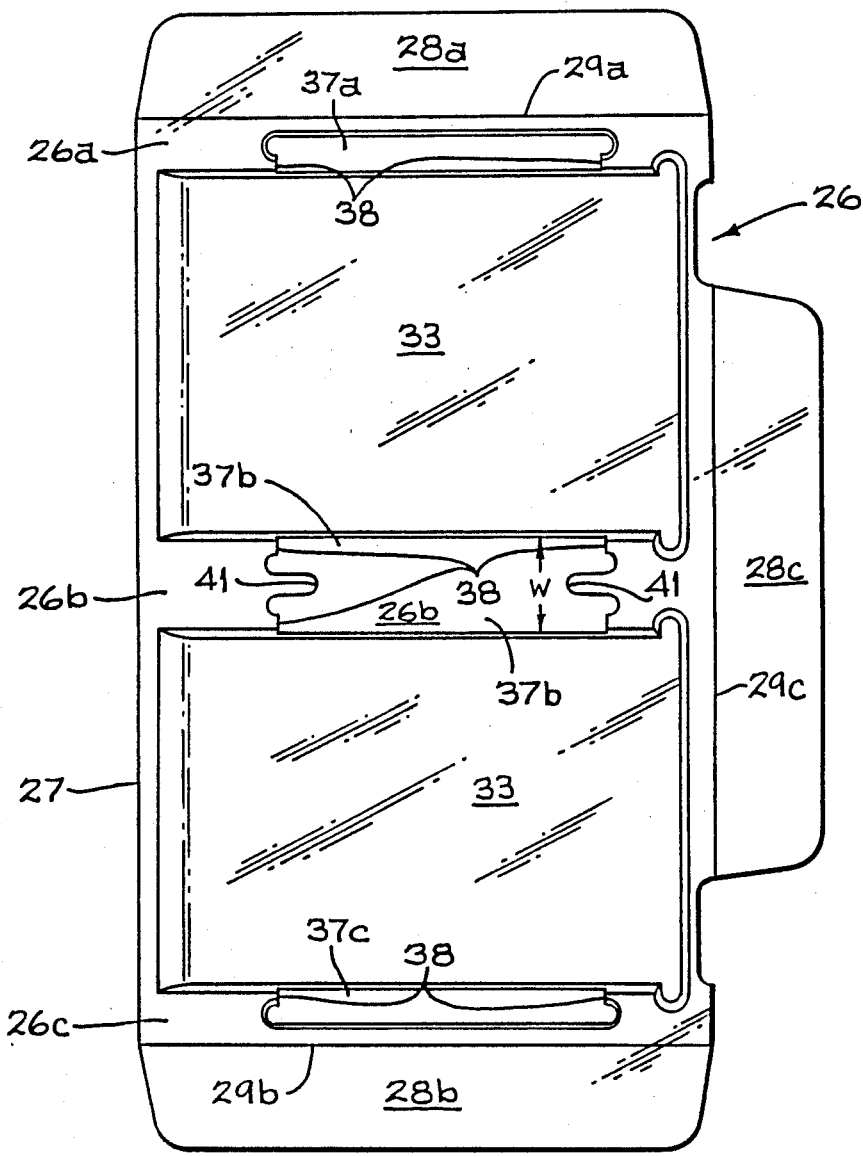
FIG_2

STORAGE CONTAINER FOR DIGITAL AUDIO TAPE CASSETTES

This invention relates generally to magnetic tape storage containers, and in particular to a storage container for retaining digital audio tape cassettes.

Digital audio tape (DAT) cassette recorders offer many attractive features to the professional broadcasting and program production users. Features that are particularly appealing to such users are the very high fidelity capability of DAT recorders, the high record media storage capacity, low record media cost, and fast start/stop operations and data access times. One feature of DAT recorders, however, has proven unattractive to the professional broadcasting and program production users. Surprisingly, the unattractive feature is the small size of the DAT cassette.

Professional tape users are accustomed to handling audio tape packages of a size comparable to the common quarter-inch Philips audio cassette, and video tape packages of the familiar VHS, Beta and 19 mm video cassettes. Consequently, current facilties of such users are arranged to accommodate these audio and video tape package sizes. For example, repositories for storing magnetic tape cassettes when not in use, such as cabinets, shelves and like receptacles, are usually constructed specially to store tape cassettes of sizes corresponding to the Philips audio cassette and the VHS, Beta and 19 mm video cassettes. In addition, the repositories are commonly arranged to permit the cassette to be placed in a storage position that allows easy observation of identifying labels fastened to the cassette or the companion protective case into which audio and video cassettes are normally placed when stored.

Unfortunately, the DAT cassette and its protective storage case are considerably smaller than the Philips audio cassette and its storage case, as well as the larger VHS, Beta and 19 mm cassette, and their respective protective storage cases. For example, the Beta video cassette has length, width and depth dimensions measuring about 15.5 cm×9.5 cm×2.5 cm, and its slightly larger companion protective storage case about 17 cm×11 cm×3 cm. In contrast to these dimension, the comparable dimensions of the much smaller DAT cassette measure only about 7 cm×5 cm×1 cm, and its slightly larger companion protective storage case only about 8 cm×6 cm×1.5 cm.

As a result of the relatively small sizes of the DAT cassette and its companion protective storage case, they have been found to be easily and frequently misplaced while removed from storage repositories and in use. Furthermore, existing storage repositories for Philips audio casettes and for common video cassettes are not suited for accommodating DAT cassettes, whether or not such casettes are placed in their companion protective storage cases. Not only are such repositories unsuited for DAT cassettes, but when used for such cassettes, they do not permit storage in a manner that facilitates observation of identifying labels placed on the cassettes or their protective cases. The small sizes of the DAT cassette and its companion protective storage case also are obstacles to placing an easily visible label on the cassette and storage case. Hence, even if repositories are specially constructed for DAT cassettes, the small size of the cassette would remain an impediment to convenient storage.

As can be appreciated from the foregoing, the small size of the DAT cassette has a number of disadvantages that professional broadcasting and program production users would perfer to eliminate. While small size ordinarily is considered an attractive packaging feature, it is not so in respect of DAT cassettes. Accordingly, many benefits will be realized by circumventing the disadvantages associated with the small size of the DAT cassette.

In accordance with the present invention, these disadvantages are circumvented by a storage container for retaining DAT cassettes and their companion protective storage cases. More specifically, the storage container is of a configuration and dimensioned to retain either two DAT cassettes, two storage cases or one cassette together with one storage case. To retain these items, the size of the DAT cassette storage container of the present invention is made comparable in size and shape to a Beta video cassette storage case, advantageously a size and shape of which professional users of tape record media are accustomed and whose existing facilities can readily accommodate without noteworthy modification. A particularly salient feature of the storage container of the present invention is the structure of the container's interior. The interior structure forms a pair of seats, with each seat of the pair having two distinct parts. A first of the two parts is of a configuration for receiving and retaining the protective storage case for DAT cassettes. A second of the two parts is of a configuration for receiving the DAT cassette itself and securely retaining the cassette in place within the container.

The DAT storage container of the present invention has the advantage of circumventing the size obstacle to the use of DAT cassettes, because it provides convenient storage for both the DAT cassette and its companion protective storage case in a receptacle of a size users are accustomed to. Moreover, the size of the container has the advantages of facilitating labeling for convenient storage and retrieval, as well as counteracting the inclination to misplace the small DAT cassettes. Providing a seat within the container for securely retaining the DAT cassette in place when outside its companion storage case also offers the advantages of protecting the DAT cassette against inadvertent damage. Such secure retention of the companion storage case within the container is unnecessary, because the DAT cassette is securely held within its companion storage case. As can be realized from the foregoing, the DAT storage container of the present invention provides great versatility to users, because they are afforded a number of cassette storage configurations from which to select.

In a preferred embodiment of the present invention, the DAT storage container defines a compact storage compartment generally of rectangular profile having a length dimension longer than its width dimension, length and width dimensions of sizes sufficient to accommodate two protective storage cases of DAT cassettes. The length of the storage compartment is more than twice the length of a DAT cassettte and twice the width of the companion storage case for the DAT cassette. In addition, the width of the storage compartment is longer than the length of storage case. A pair of receptacles are formed within the storage compartment, each accommodating a cassette storage case with its length dimension in a first orientation and a DAT cassette with its length dimension in a second orientation orthogonal to the first orientation.

Other features and advantages of the storage container of the present invention will become more apparent upon consideration of the following description of preferred embodiments of the present invention and claims together with the accompanying drawings in which:

FIG. 1 is a perspective view of a preferred embodiment of the cassette storage container of the present invention, wherein a DAT cassette case is shown ready for storage in one position and the DAT cassette itself is shown ready for storage in a second position; and FIG. 2 is a plan view of a partition employed in the storage container illustrated in FIG. 1.

A preferred embodiment of the DAT storage container 10 of the present invention is illustrated in FIG. 1. The container includes a box 12 of rectangular profile and molded from plastic as an unitary structure including a rectangular bottom wall 14, a rectangular top wall 16, a rectangular spline 18 and three rectangular side walls 22, 23, 24. The three side walls are fixed rigidly to and extend perpendicularly from the perimeter of the bottom wall 14 to enclose three sides of the box 12. To permit the box 12 to be opened and closed, seams 11a and 11b are formed in the box 12 to join the spline 18 to the bottom and top walls 14 and 16. The two seams 11a and 11b form a pair of hinges that permit the top wall 16 to serve as a cover and be closed over the bottom wall 14. The thusly formed box 12 defines within its walls a parallelepiped storage compartment 21 for DAT cassettes 36 and companion protective storage cases 34.

Each DAT cassette 36 is generally a parallelepiped whose length, L, is about ⅓ longer than its width, W, with the depth, D, of the cassette being very much smaller. The DAT storage case 34 is generally of the same configuration as the cassette 36, although the case 34 is somewhat longer, wider, and deeper than the cassette 36, so that it can accommodate both the cassette 36 and asscoiated labels and other inserts. While each of the length, width and depth dimensions of the DAT cassette 36 is smaller than the corresponding dimension of the cassette's companion storage case 34, the length of the DAT cassette is longer than the width of its storage case.

In accordance with the present invention, the box 12 is configured and dimensioned to provide a parallelepiped storage compartment 21 for retaining either two DAT cassettes 36, or two DAT storage cases 34 or one DAT cassette 36 together with one storage case 34. To optimize space utilization within the storage container 10, the length L, width, W, and depth, D, dimensions of the box 12 are specially selected to provide a compact storage compartment 21 for retaining cassettes 36 and cases 34. More specifically, the length, L, of the box 12 is selected so that the corresponding length of the storage compartment 21 is little more than twice the length, L, of the DAT cassette 36. In addition, the width, W, of the box 12 is selected so that the corresponding width of the storage compartment 21 is a little longer than the length, L, of the cassette storage case 34. With these dimensions and configuration, two DAT cassettes 36 can be seated within the storage compartment 21 with their length, L, dimensions aligned end-to-end, or two storage cases 34 can be seated within the storage compartment 21 side-by-side with their length, L, dimensions parallel to each other, or one cassette 36 and one storage case 34 can be seated within the storage compartment 21 with their respective length, L, dimensions orthogonal. Providing seats within the storage compartment 21 for the cassettes 36 and their companion storage cases 34 so that the length dimension of a seated cassette 36 is orthogonal to the length dimension of a seated case 34 has the added important advantage of enabling a compact construction for the storage container 10 in the depth, D, dimension. This compact construction is made possible because the aforedescribed orthogonal seating of the DAT cassettes 36 and storage cases 34 permits the storage volume provided within the storage compartment 21 for each cassette 36 to occupy substantially the same space as the storage volume provided for a storage case 34.

Referring now to both FIGS. 1 and 2, the seats for supporting the DAT cassettes 36 and companion storage cases 34 within the storage compartment 21 are formed by a partition 26, preferably a separate, thin, thermoformed plastic member of generally rectangular shape that is inserted within the box 12. The partition 26 has a platform member 27 and three leg members 28a, 28b, 28c integrally formed with the platform member. The legs 28a, 28b, 28c are joined to the platform 27 by seams 29a, 29b, 29c, respectively, that permit the legs to be bent perpendicularly relative to the platform for resting on the bottom wall 14. The partition 26 is of a configuration and dimensions so that the platform 27 encompasses the length and width of storage compartment 21 and is supported by the legs 28a, 28b, 28c at a distance above the bottom wall 14. To secure the partition 26 in place within the storage compartment 21 and provide structural support for the platform 27, the legs 28a, 28b, 28c are disposed respectively against the side walls 22, 23, 24 and fastened to them with a suitable adhesive. With the partition 26 thusly inserted in the box 12, the storage compartment is advantageously divided into two parts, an upper compartment 21a opening towards the top wall or cover 16 and a lower compartment 21b between the platform 27 and bottom wall 14 opening towards the spline 18.

The partition 26 forms the seats for supporting the DAT cassettes 36 and their companion storage cases 34 within the upper compartment 21a. In addition to so forming the seats, however, it forms the lower compartment 21b, which is suited for storing a program log, a floppy disk or other documentary materials (not shown) ordinarily accompanying DAT cassettes. As can readily be appreciated from a glance at the standard companion protective storage case 34 for DAT cassettes 36, there is little, if any, space for the storage of such materials within the storage case 34. Where DAT cassettes have previously been used, such documentary materials have either been inconveniently stored separate from the cassettes or fastened to the cassettes with rubber bands and the like. Such storage methods are inconvenient, unsightly and inclined to lead to the misplacement or loss of the documentary materials. The structure of the preferred embodiment of the storage container 10 of the present invention advantageously avoids all such undesirable consequences of the small size of protective storage cases 34 for DAT cassettes 36.

Returning to the primary function served by the partition 26, forming seats for the DAT cassettes 36 and their companion storage cases 34, the top surface of the platform 27 has a pair of side-by-side recesses formed therein, each of which defines a receptacle 33 that forms a seat for retaining DAT storage cases 34. Each of these receptacles 33 has a generally rectangular profile and is dimensioned to permit a storage case 34 to be retained in it with the cover 16 of the box 12 closed. This is achieved by making the depth dimension of each recess large enough so that the distance from its bottom to the free end of the side walls 22, 23, 24 is slightly longer than the size of the depth, D, of the storage case 34. The length dimension of each receptacle 33 extends in the direction of the width, W, of the storage container 10, and the length and width dimensions of the receptacle are a little larger than the length, L, and width, W, of the storage cases 34 to be placed therein. The two side-by-side receptacles 33 are separated along their length dimension by a median partition 26b formed by a raised web located between the pair of receptacle-defining recesses 33 formed in the top surface of the platform 27. As will become more apparent from the following description of a second pair of seats provided by the partition 26 for the DAT cassettes 36, the width, W, of the median partition 26b is made large enough so that a pair of DAT cassettes 36 can be secured between opposite side walls 22 and 23 with their length, L, dimensions aligned end-to-end.

To provide a secure retention of the DAT cassettes 36 within the storage compartment 21, the opposite walls 26a, 26c and the median partition 26b of the platform 27 define shelves 37a, 37b, 37c, each of which forms a seat for supporting one end of a DAT cassette 36. Each shelf 37, 37b, 37c has a length bounded by a pair of opposing shoulders 38. The distance between a pair of opposing shoulders 38, disposed on each sidewall 26a, 26c and median partition 26b, closely corresponds to the width, W, of the cassette 36. A pair of oppositely pointing fingers 41 is formed at the top and centrally of the width of the median partition 26b. These fingers 41 extend towards each other from opposite ends of the median partition 26b a short distance beyond the proximate shoulders 38 to form an end stop for the two DAT-cassette seats on the shelf 37b. The distance between the back of each shelf 37a and 37c located proximate a side wall 22 and 23 and the facing side of the oppositely pointing fingers 41 closely corresponds to the length, L, of the DAT cassette 36. These dimensions of the separation of opposing shoulders 38 and of the separation of each shelf 37a, 37c and fingers 41 provide a receptacle that forms a seat for snugly receiving and securely retaining DAT cassettes 36 within the storage compartment. The thermoformed plastic member forming the partition 26 is selected to be thin so that the shoulders 38 and fingers 41 are somewhat flexible to facilitate seating and unseating of the DAT cassettes 36. Such secure retention of the companion storage cases is unnecessary, because the DAT cassettes are securely held within the storage cases. Therefore, the length and width dimensions of each of the receptacles 33 can be larger than the corresponding dimensions of the storage cases 34 to permit the cases to be loosely seated in the receptacles 33.

In accordance with a particularly advantageous feature of a preferred embodiment of the storage container 10 of the present invention, the shelves 37a, 37b, 37c are located in the same plane at a distance below the free ends of the side walls 22, 23, 24 that is slightly longer than the depth, D, of the DAT cassette 36. In this manner, the storage volume provided within the storage compartment 21 for DAT cassettes 36 occupy substantially the same space as the storage volume provided in the compartment for DAT storage cases 34. As a result of this arrangement of storage volumes, a compact construction is obtained for the storage container 10 in the depth, D, dimension.

It will be appreciated from the foregoing description of a preferred embodiment, the DAT storage container 10 of the present invention circumvents the numerous disadvantages attributed to the small package sizes of the DAT cassette and its companion storage case. The container is of a size that provides convenient storage for DAT cassettes and their storage cases. Importantly, the storage container is of a configuration and size similar to Beta video cassette storage cases, which professional audio and video cassette users are accustomed to. This configuration and size are compatible with existing storage repositories found in facilities where DAT cassettes are customarily used, and facilitate labeling for convenient storage and retrieval. For example, visible labels can be placed on either the front or the cover 16 or the outside of the spline 18. Such labeling readily permits sighting from a distance, whether the storage container is placed on a work space or stored away in a common repository. Moreover, embodiments including the partition 26 have the additional advantage of including a compartment 21b specially suited for storage of documentary material typically accompanying DAT cassettes. All of these advantages of the storage container of the present invention counteract the inclination of users to misplace the small DAT cassettes and their companion storage cases.

In addition to circumventing the many disadvantages associated with the small DAT cassettes and storage cases, the storage container of the present invention provides great versatility to users of such cassettes, because the container offers users several DAT cassette storage configurations from which to select according to their needs. Futhermore, the container is characterized by efficient use of storage space and compact construction.

Although the storage container of the present invention has been described with reference to the preferred embodiment illustrated by FIGS. 1 and 2, those skilled in the art will appreciate that many variations of the structure of this preferred embodiment are possible. For example, the separate, thermoformed partition can be eliminated, and instead side walls 26a and 26c median partition 26b formed as separate structures fastened within the storage compartment 21. Moreover, it is not necessary to provide shelves 37a, 37b, 37c for supporting the DAT cassettes within the storage compartment 21. Each of oppositely facing shoulders 38 can be formed as separate bodies and fastened within the storage compartment 21. In such an embodiment, both the DAT cassette 36 and storage case 34 would be seated on the interior surface of the bottom wall 14. These alternate embodiments do not provide a separate compartment for storing documents and like materials typically accompanying DAT cassettes. However, if the storage container is constructed with sufficient depth, such materials can be placed on top of the DAT cassette items stored within the container. It therefore is not intended that the scope of the invention be limited other than by the claims and their equivalence.

I claim:

1. A storage container for storing tape cassettes and companion cases that house said cassettes, each said cassette of a generally rectangular configuration having a length larger than a width of said companion case, comprising:

interconnected walls forming a housing of a generally rectangular configuration, having length and width dimensions defining an interior space having two substantially coplanar, generally rectangular receptacles, each receptacle for interchangeably receiving only one of a cassette and a companion case, respectively;

a first and a second pair of seats disposed within each said receptacle, said first pair of seats disposed within each receptacle at opposite first ends thereof to store cassettes with their lengths aligned in an end-to-end relationship in the direction of the length dimension of said housing, said second pair of seats disposed within each receptacle at opposite second ends thereof orthogonal said first ends, to store companion cases with their widths aligned in an end-to-end relationship in the direction of the length dimension of said housing, whereby cassettes and companion cases are stored in said housing with their lengths aligned in an orthogonal relationship relative to each-other.

2. The storage container of claim 1, wherein said first pairs of seats comprise coplanar opposite shelves having length dimensions extending in parallel with respect to each other, each length dimension corresponding to a width of said cassette, for supporting said cassette in said end-to-end relationship.

3. The storage container of claim 2, wherein each said shelf is made of a substantially resilient material for snugly accommodating and securely holding said cassette within said container.

4. The storage container of claim 1, futher comprising a platform member arranged within said interior space of said housing for dividing said interior space into upper and and lower storage compartments, said platform member defining said two substantially coplanar, generally rectangular receptacles within said upper storage compartment.

* * * * *